United States Patent [19]

Itabashi et al.

[11] 4,001,187

[45] Jan. 4, 1977

[54] METHOD OF PRODUCING POLYESTERS TEREPHTHALIC ACID AND ETHYLENE GLYCOL

[75] Inventors: Yoshio Itabashi; Kentaro Noguchi; Masao Seki, all of Hofu, Japan

[73] Assignee: Kanebo, Ltd., Tokyo, Japan

[22] Filed: July 11, 1974

[21] Appl. No.: 487,755

Related U.S. Application Data

[63] Continuation of Ser. No. 250,345, May 4, 1972, abandoned.

[30] Foreign Application Priority Data

Dec. 29, 1971 Japan .............................. 47-34491
Mar. 13, 1972 Japan .............................. 47-25405
Mar. 13, 1972 Japan .............................. 47-25406

[52] U.S. Cl. ............................ 260/75 M; 260/75 R
[51] Int. Cl.² .................................... C08G 63/18
[58] Field of Search ............ 260/75 M, 475 P, 75 R

[56] References Cited

UNITED STATES PATENTS

| | | | |
|---|---|---|---|
| 3,427,287 | 2/1969 | Pengilly | 260/75 |
| 3,431,243 | 3/1969 | Uno et al. | 260/75 |
| 3,497,473 | 2/1970 | Kemkes | 260/75 |
| 3,590,072 | 6/1971 | Leybourne | 260/475 |
| 3,655,729 | 4/1972 | Rinehart | 260/475 |
| 3,689,461 | 9/1972 | Balint et al. | 260/75 |
| 3,781,213 | 12/1973 | Siclari et al. | 252/188.3 |

FOREIGN PATENTS OR APPLICATIONS

| | | | |
|---|---|---|---|
| 783,594 | 4/1968 | Canada | |
| 36,732 | 11/1970 | Japan | 260/75 |

OTHER PUBLICATIONS

Gehrke et al., Faserforsch. Textiltech. 17(5), 201–207(1966).

*Primary Examiner*—Lester L. Lee
*Attorney, Agent, or Firm*—Woodhams, Blanchard and Flynn

[57] ABSTRACT

Polyethylene terephthalates having high quality, particularly an improved color tone are produced by a direct esterification from particularly defined terephthalic acid and ethylene glycol.

28 Claims, No Drawings

METHOD OF PRODUCING POLYESTERS TEREPHTHALIC ACID AND ETHYLENE GLYCOL

This is a continuation of application Ser. No. 250,345, filed May, 4, 1972, and now abandoned.

The present invention relates to a method of producing polyesters and more particularly a method of producing polyethylene terephthalate from terephthalic acid and ethylene glycol.

Heretofore, polyethylene terephthalate has been generally produced by an ester interchange process which passes through bis-(β-hydroxyethyl) terephthalate from dimethyl terephthalate and ethylene glycol and by a direct process which passes through bis-(β-hydroxyethyl)terephthalate directly from terephthalic acid and ethylene glycol.

The ester interchange process which uses dimethyl terephthalate as a starting material has advantages that dimethyl terephthalate has a relatively low melting point and is easily soluble and therefore dimethyl terephthalate and ethylene glycol react uniformly and bis-(β-hydroxyethyl) terephthalate, which is an intermediate of polyethylene terephthalate, can be easily obtained and that impurities contained in terephthalic acid are removed in the step for producing dimethyl terephthalate. This process needs an extra step for esterifying terephthalic acid with methyl alcohol to produce dimethyl terephthalate and further it is necessary to remove methyl alcohol by-produced in the ester interchange step. Consequently this process has not been fully satisfactory from the viewpoints of apparatus and operation efficiency.

On the other hand, the direct process is superior theoretically to the ester interchange process but it has various problems in practice. Namely, terephthalic acid is not soluble in ethylene glycol and is generally low in apparent density and consequently it is difficult for terephthalic acid to be homogeneously dispersed in or mixed with an amount of ethylene glycol theoretically required for the esterification. In addition, side-reaction products, such as diethylene glycol produced by an etherification reaction of ethylene glycol during the esterification reaction are formed and the qualities of fibers or films manufactured from the resulting polyethylene terephthalate are considerably degraded. Moreover, a small amount of impurities contained in terephthalic acid affects adversely the qualities of polyethylene terephthalate produced therefrom, particularly the color, so that unless the impurities are removed by purification, it is impossible to obtain fibers or films having high qualities.

In order to obviate such defects in the direct esterification process, a large number of proposals have been already made. For example, it has been proposed to select catalysts, to use highly purified starting materials, to control harmful components by defining conditions for production, to add a stabilizer, such as phosphorus compounds or to improve apparatus for production. For example, the esterification reaction is effected at a temperature higher than the boiling point of ethylene glycol under a high pressure (Japanese Patent Application Publication No. 3,168/58), the esterification reaction is effected in the presence of bis-(β-hydroxyethyl)terephthalate (Japanese Patent Application Publication No. 8,919/57), 1–2 moles based on terephthalic acid of ethylene glycol is used (Japanese Patent Application Publication No. 12,448/61), an alkali metal salt of terephthalic acid is used for preventing the side-reaction (Japanese Patent Application Publication No. 2,594/59) and after added cobalt compounds to the esterification reaction system, stannic chloride and phosphoric acid or phosphorous acid are used in the polycondensation reaction (Japanese Patent Application Publication No. 1,436/66). Furthermore, a large number of processes for purifying terephthalic acid have been proposed.

In spite of the fact that such a large number of proposals have been made, the direct esterification process has not been adopted commercially in place of the ester interchange process, because terephthalic acid is lower in the operation efficiency than dimethyl terephthalate, that is terephthalic acid is lower in its dipersability in ethylene glycol.

In the production of polyethylene terephthalate, the improvement of operation efficiency is very important and a variety of processes have been proposed.

For example, a process for improving the dispersability of terephthalic acid by adding water to obtain a homogeneous slurry without increasing the amount of ethylene glycol (Japanese Patent Application Publication No. 3,840/61), a process for forming a slurry having an excellent fluidity by adding into the slurry a dispersant, such as hydrocarbons, ketones, ethers, aliphatic monohydric alcohols having a lower boiling point than ethylene glycol and the like have been disclosed. These processes have merits in that an appropriate amount of ethylene glycol based on terephthalic acid can be maintained and terephthalic acid is homogeneously dispersed in ethylene glycol, while they need means for removing and recovering the dispersant and therefore these processes are not preferable in view of the operation and installation complexities.

It is preferred in order to improve the operation efficiency in the commercial production to feed terephthalic acid and ethylene glycol in a slurry form and when the polymerization is effected in a sealed vessel, such as a pressure vessel, it is an essential requirement to feed both the components in a slurry form and such a requirement is particularly important in the case of a continuous esterification or a semi-continuous esterification.

However, the previous investigations for improving the dispersability of terephthalic acid in ethylene glycol have been directed to the selection of dispersant and the improvement of reaction condition and no investigation has been made regarding terephthalic acid per se.

In general, crude terephthalic acid has more excellent dispersability in ethylene glycol than purified terephthalic acid but contains coloring impurities. Accordingly, when such crude terephthalic acid is directly used for the esterification with ethylene glycol, it is impossible to obtain fiber-forming polyester, which requires an improved color tone. For example, crude terephthalic acid obtained by oxidation of p-xylene contains more than 2,000 ppm of 4-carboxybenzaldehyde, necessarily by-produced during the production step and a small amount of the other coloring substances and these substances color the polyester formed after the polycondensation and therefore the crude terephthalic acid is generally purified to remove the impurities and the resulting terephthalic acid is used as the starting material, but the purified terephthalic acid is very poor in the dispersability in ethylene glycol and it has many problems for the commercial use.

Even if it is possible to decrease the content of 4-carboxybenzaldehyde by modifying the reaction conditions in the production of terephthalic acid, there are the other coloring substances and therefore it is very difficult to obtain polyesters having an improved color tone by directly using the resulting terephthalic acid.

The inventors have clarified essentially the dispersability of terephthalic acid in ethylene glycol and the coloring impurities contained in the terephthalic acid and studied fully the correlation to the conditions for producing polyesters and as the result the present invention has been accomplished.

An object of the present invention is to provide polyethylene terephthalates having high qualities, particularly an improved color tone.

A further object is to provide a method of producing easily and on a commercial basis polyethylene terephthalates having high qualities at a low cost.

The other objects will be seen from the following descriptions.

The present invention consists in a method of producing polyesters from terephthalic acid and ethylene glycol, which is characterized in that a slurry of (a) terephthalic acid having a slurry forming ability of not more than 0.48 and a slurry stability of not less than 60% and having 4-carboxybenzaldehyde content of not more than 600 ppm and $b$ value of not more than 2.0 in (b) ethylene glycol, said ethylene glycol being not more than 1.3 mole based on 1 mole of terephthalic acid, is added continuously into the reaction system containing bis-($\beta$-hydroxyethyl)terephthalate and the resulting mixture is reacted at a temperature of not lower than 240° C to remove the formed water gradually from the reaction system and then the polycondensation is effected. The term "bis-($\beta$-hydroxyethyl)terephthalate" used herein means not only that compound itself but also includes the dimer or trimer or the oligomer thereof.

The dispersability of terephthalic acid in ethylene glycol is influenced by the grain size, the surface area per unit weight and the like.

According to the present invention, the properties of "slurry forming ability" and "slurry stability" of terephthalic acid influence its reactivity with ethylene glycol, operation efficiency and qualities of the finally obtained polyester and they reflect the physical form of the surface of terephthalic acid. In other words, they indicate the activity of the surface of terephthalic acid grains against ethylene glycol. In general, terephthalic acid having a large average grain size and a high bulk density forms a slurry with a small amount of ethylene glycol and shows an excellent slurry forming ability but terephthalic acid in the formed slurry precipitates in a short time and such a slurry shows a low stability, because the grain size of terephthalic acid is large. On the other hand, terephthalic acid having a high slurry stability is generally small in the average grain size and low in the bulk density. Accordingly, a large amount of ethylene glycol is required for the formation of slurry, so that such terephthalic acid is low in the slurry forming ability. The inventors have studied the physical form in the surface of terephthalic acid in detail and found that the defined values of "slurry forming ability" and "slurry stability" are essentially necessary for obtaining the slurry suitable for the esterification reaction. When terephthalic acid satisfying the defined values of slurry forming ability and slurry stability is used, ethylene glycol is easily adsorbed on the surface of terephthalic acid and the affinity of both the components is improved and such terephthalic acid is homogeneously dispersed in a small amount of ethylene glycol and further the slurry form can be maintained for a long time.

The slurry forming ability of terephthalic acid to be applied for the present invention is not more than 0.48, preferably not more than 0.45, more particularly not more than 0.43. The slurry stability is not less than 60%, preferably not less than 65%, more particularly not less than 70%.

The "slurry forming ability" and the "slurry stability" of terephthalic acid are determined by processes as described hereinafter and the defined values are essential requirements for carrying out the direction esterification process commercially.

The "slurry forming ability" means the weight ratio of ethylene glycol/terephthalic acid in a slurry having a viscosity of 30 poises and is determined as follows. To 100 parts by weight of terephthalic acid is added ethylene glycol in such an amount that the viscosity when measured by B-type viscosimeter becomes 40 to 60 poises after the resulting mixture is stirred and then to the formed slurry is added increments 0.5 part by weight of ethylene glycol and the viscosity is measured every time and the total amount of ethylene glycol when the viscosity becomes 30 poises is determined.

The "slurry stability" is determined in the following manner. The above described slurry having a viscosity of 30 poises is charged into a vessel having an inner diameter of 75 mm to a depth of 10 cm and after being left to stand for 5 minutes, the viscosity $\eta$ of the slurry is measured by B-type viscosimeter. The slurry stability is determined by the following equation:

$$\text{Slurry stability} = \eta/30 \times 100 \, (\%).$$

When the slurry forming ability of terephthalic acid exceeds 0.48 or the slurry stability is less than 60%, the affinity of terephthalic acid with ethylene glycol is poor and when a small amount of ethylene glycol is used, a homogeneous slurry is not formed and the esterification reaction is not carried out uniformly and the reactivity lowers and accordingly the rate of addition of the slurry must be decreased, so that the productivity considerably decreases and in the transfer various problems occur. For example, clogging of the feeding pump and pipe and variation of the amount supplied are caused and in the continuous operation the pump must be stopped and therefore polyethylene terephthalate having high quality cannot be obtained and the operation efficiency considerably lowers.

The terephthalic acid to be used in the present invention must have an excellent dispersability in ethylene glycol, that is a slurry forming ability of not more than 0.48 and a slurry stability of not less than 60%, and further should be small in the content of coloring impurities, that is not more than 600 ppm of 4-carboxybenzaldehyde and not more than 2.0 of $b$ value.

The $b$ value shows the measurement of color tone of terephthalic acid and influences considerably upon the color tone particularly, the $b$ value of polyester.

Considering only the content of 4-carboxybenzaldehyde in terephthalic acid, it is preferred to be small and if the content of 4-carboxybenzaldehyde is not more than 600 ppm, the fiber-forming polyester is obtained.

The amount of 4-carboxybenzaldehyde is preferred to be not more than 400 ppm, more particularly, not more than 300 ppm. When the content of 4-carboxybenzaldehyde exceeds 600 ppm, the color tone becomes deteriorated and the resulting polymer cannot be used for fibers.

Terephthalic acid contains a slight amount of coloring substances by-produced in the production step and therefore it is colored in such an extent that it is impossible to identify the color by the naked eye. According to the present invention, even if the content of 4-carboxybenzaldehyde is not more than 600 ppm, unless the $b$ value is not more than 2.0, the polyesters having a high quality cannot be obtained. When the $b$ value of terephthalic acid exceeds 2.0, polyesters having a favorable color tone cannot be obtained. The $b$ value of terephthalic acid is preferred to be not more than 1.5, more particularly not more than 1.0.

However, the inventors succeeded in the production of polyesters having an improved color tone by the presence of a given amount of cobalt compounds in the polycondensation even by using terephthalic acid having more than 600 ppm of 4-carboxybenzaldehyde and more than 2.0 of $b$ value, provided that the content of 4-carboxybenzaldehyde is not more than 1,000 ppm and $b$ value is not more than 2.5. When a cobalt compound is used in terephthalic acid having 4-carboxybenzaldehyde of not more than 600 ppm and $b$ value of not more than 2.0, polyesters having a particularly excellent color tone can be obtained. The above described object can be attained by continuously feeding to a reaction system containing bis-($\beta$-hydroxyethyl)-terephthalate a slurry containing 1 mole of terephthalic acid having a slurry forming ability of not more than 0.48, a slurry stability of not less than 60%, 4-carboxybenzaldehyde of not more than 1,000 ppm and $b$ value of not more than 2.5 in not more than 1.3 moles of ethylene glycol, reacting the resulting mixture at a temperature of not lower than 240° C to remove the formed water gradually from the reaction system and effecting the poly-condensation in the presence of a cobalt compound containing 0.05–3.0 of cobalt atomic equivalent per 1 mole of 4-carboxybenzaldehyde in said terephthalic acid. When a cobalt compound is used in the polycondensation, if the content of 4-carboxybenzaldehyde in terephthalic acid is not more than 1,000 ppm, fiber-forming polyesters can be produced but the amount is preferred to be smaller, preferably not more than 600 ppm, particularly not more than 400 ppm. When the content of 4-carboxybenzaldehyde exceeds 1,000 ppm, the color tone becomes deteriorated and the resulting polymer cannot be used. Even if the content of 4-carboxybenzaldehyde is not more than 1,000 ppm, unless the $b$ value is not more than 2.5, polyesters having a high quality cannot be obtained even by using a cobalt compound. In this case, the $b$ value of terephthalic acid is preferred to be not more than 2.0, more particularly not more than 1.5.

In the present invention, since terephthalic acid having the defined slurry forming ability and slurry stability and ethylene glycol are fed in the slurry form, the drawbacks that occur when terephthalic acid and ethylene glycol are fed separately, that is, difficulty in feeding of a given amount of powdery terephthalic acid and non-uniformity of reaction due to the variation of ratio of ethylene glycol to terephthalic acid, can be obviated and the transfer of the starting materials can be effected easily and automatically. Furthermore, the ratio of ethylene glycol to terephthalic acid can be decreased and the esterification reaction can be carried out efficiently.

The molar ratio of ethylene glycol to terephthalic acid is not more than 1.3, preferably not more than 1.2 and more particularly not more than 1.15.

When the amount of ethylene glycol based on terephthalic acid is larger, the dispersion of terephthalic acid is improved, while a by-product is formed by etherification reaction. Accordingly, in order to overcome such a defect, various attempts have been made, for example, a dispersant, such as water is used or a large amount of ethylene glycol is added together with terephthalic acid and then an excess amount of ethylene glycol is rapidly discharged from the reaction system and only an appropriate amount of ethylene glycol is retained in the reaction system. However, these means have not been satisfactory in view of the operation and installation complexities.

When, in the method of the present invention, the amount of ethylene glycol exceeds 1.3 moles, by-products, such as diethylene glycol and the like increase and it is impossible to obtain polyethylene terephthalate having high qualities for fibers or films. The molar ratio of ethylene glycol to terephthalic acid has a close correlation to the slurry forming ability and the slurry stability.

When the content of 4-carboxybenzaldehyde, the $b$ value in terephthalic acid, the slurry forming ability, slurry stability, molar ratio of ethylene glycol to terephthalic acid and reaction temperature satisfy the stated requirements, polyesters having an high quality can be obtained.

According to the present invention, a slurry of terephthalic acid in ethylene glycol is fed continuously into a reaction system containing bis-($\beta$-hydroxyethyl) terephthalate but the esterification is effected in a semi-continuous system or a continuous system and hence bis-($\beta$-hydroxyethyl)terephthalate may be produced only at the starting stage by a convenient process, for example, an ester interchange process or a direct esterification process or bis-($\beta$-hydroxyethyl)-terephthalate prepared in other system may be used. In this case, the amount of bis-($\beta$-hydroxyethyl)terephthalate is not particularly defined.

The temperature of the esterification reaction is not lower than 240° C, generally 245–260° C. In the present invention, the affinity of terephthalic acid with ethylene glycol is excellent and both the components are in contact with each other and consequently the reaction proceeds uniformly and it is possible to increase the reaction rate without causing the side reaction. Even though a temperature of lower than 240° C can form a homogeneous slurry, the reaction rate is slow and a long time is necessary to effect a desired esterification and therefore the content of by-products not only increases but also the residence time is long and such a temperature is not desirable.

Heretofore, the direct esterification of terephthalic acid with ethylene glycol must be usually effected under pressure, while in the present invention the affinity of terephthalic acid with ethylene glycol is high and the reaction rate is rapid, so that it is not necessary to effect the reaction under pressure. The reaction under atmospheric pressure can simplify the installations and the method of the present invention is advantageous. Water formed in the esterification reaction is removed gradually from the reaction system to effect the reaction uniformly. Then the polycondensation is effected in a conventional process or the polycondensation is effected in the presence of a cobalt compound of 0.05–3.0, preferably 0.10–2.0, more particularly 0.2–1.0 as cobalt atomic equivalent per 1 mole of 4-carboxybenzaldehyde in the terephthalic acid. When the content of cobalt compound is less than 0.05 as cobalt atomic equivalent, the improvement of color tone of polyesters cannot be attained, while when the content exceeds 3.0, the improvement of the color tone of the resulting polymers lowers and the degradation of the polymer in the heat melting is promoted and these contents are not preferable.

As the cobalt compounds to be used in the present invention, mention may be made of inorganic salts, such as cobalt chloride, cobalt nitrate, cobalt carbonate, cobalt borate, etc. and organic salts, such as cobalt acetate, cobalt benzoate, cobalt oxalate, etc. and among these salts cobalt acetate is particularly preferable. It is desirable that these cobalt compounds are present before the start of the polycondensation and at the stage where a high temperature is retained in the polycondensation reaction, the reaction system must contain the cobalt compound.

The terephthalic acid to be used in the present invention which has excellent slurry forming ability and slurry stability and a low content of 4-carboxybenzaldehyde and further a low $b$ value can be obtained, for example, by oxidizing p-xylene with air in a liquid phase in the presence of a cobalt compound as the main catalyst and a manganese compound as a promotor and bromine or a bromine compound as an initiator by using acetic acid as a solvent at a high temperature and under a pressure, said temperature and pressure being lower than those in the production of usual crude terephthalic acid and separating the resulting terephthalic acid from the mother liquid and washing it with acetic acid.

In the method of the present invention, polycondensation catalysts, various additives, such as inhibitors for etherification, various fluorescent agents, pigments, delustering agents and the like may be used together depending upon the object.

In the present invention, the slurry may be fed into the reaction vessel by a convenient means, such as gear pump. The method of the present invention can be utilized for the direct esterification process and also for the direct esterification-polycondensation process wherein the direct esterification and the polycondensation are carried out continuously.

The present invention can produce polyethylene terephthalate having a good color tone, improve the operation efficiency, increase the reaction rate, simplify the steps and installations and decrease the production cost by converting the starting materials, so that the productivity is considerably improved.

The following examples are given for the purpose of illustration of this invention and are not intended as limitations thereof. In the examples, "part" and "%" mean "part by weight" and "% by weight".

The intrinsic viscosity [$\eta$] of the resulting polyester was measured at 20° C in a mixed solvent of phenol/dichloroethane (1/1).

Content (%) of diethylene glycol in the resulting polyester was determined as follows. The polyester is saponified with methanolic potassium hydroxide, and the saponified product is neutralized with terephthalic acid and subjected to a gaschromatography. The content of diethylene glycol is shown by mol% of diethylene glycol in the total amount of diethylene glycol and ethylene glycol. In the practical use of the polyester, the content must be less than 2.5 mol%, and when high qualities are required for the textile filament, it is preferred to be less than 2.0 mol%.

Color tone of the polyester was measured by means of a color-difference meter and represented by L, $a$ and $b$ values. Among them L value and $b$ value are important. Particularly, the $b$ value is an index showing an extent of undesirable yellow color for the fiber, and it must be practically $|b| < 5$, preferably $|b| < 4$. The term $|b|$ shows the absolute value of $b$. The L value is an index showing a lightness, and it must be practically $L > 65$, preferably $L > 70$.

The $b$ value of terephthalic acid and polyester was measured by means of an ND-K5 type color-difference meter made by Nippon Denshoku K.K.

EXAMPLE 1

A slurry was prepared by kneading 166.0 parts of terephthalic acid (hereinafter abridged as TPA) containing 360 ppm of 4-carboxybenzaldehyde (hereinafter abridged as 4-CBA) and having a slurry forming ability of 0.40, a slurry stability of 72% and $b$ value of 1.1 and 68.2 parts of excellent pure ethylene glycol (hereinafter abridged as EG), and the resulting slurry was reacted at a temperature of 240° to 250° C and under a pressure of 2.5 Kg/cm$^2$ for 2.5 hours in a reaction vessel equipped with a fractionating column and a stirrer to obtain 34.2 parts of water and 200 parts of a polyester oligomer (ester conversion ratio:95.0%). Into a reacton vessel equipped with a fractionating column and a stirrer was charged 100 parts of the above obtained polyester oligomer and melted. Then, slurries composed of the above described TPA and EG in various molar ratios as shown in the following Table 1 were fed to the above melted polyester oligomer in an amount of 86.5 parts calculated as TPA, and esterification reactions were effected under the conditions as shown in Table 1 to obtain esterification products. 100 parts of the resulting esterification product was left in the reaction vessel. The remainder of the esterification product was taken out from the vessel and polycondensed in the presence of 0.03 part of antimony trioxide. The above described esterification reaction and polycondensation reaction were repeated 5 times. Properties of the resulting polyester obtained in the 5th time of the procedure are shown in Table 1.

Table 1

| Experiment No. | Esterification | | | | | Polycondensation | | | Properties of polyester | | | | |
|---|---|---|---|---|---|---|---|---|---|---|---|---|---|
| | EG/TPA (molar ratio) | Viscosity of slurry (poise) | Temperature (° C) | Feeding rate of slurry (part/min.) | Total esterification time (min.) | Temperature (° C) | Time (min.) | Intrinsic viscosity [$\eta$] | Melting point (° C) | *DEG (mol%) | Color tone | | |
| | | | | | | | | | | | L | a | b |
| 1 | 1.10 | 25 | 250 | 0.812 | 165 | 280 | 160 | 0.65 | 264.0 | 1.30 | 77.0 | −1.2 | 3.0 |
| 2 | 1.15 | 18 | ″ | 0.798 | 170 | ″ | 165 | ″ | 263.5 | 1.40 | 76.8 | −1.5 | 3.4 |
| 3 | 1.20 | 13 | ″ | 0.740 | 190 | ″ | 175 | ″ | 262.0 | 1.67 | 75.1 | −1.8 | 3.7 |

Table 1-continued

| Experiment No. | Esterification | | | | | Polycondensation | | | Properties of polyester | | | | |
|---|---|---|---|---|---|---|---|---|---|---|---|---|---|
| | EG/TPA (molar ratio) | Viscosity of slurry (poise) | Temperature (°C) | Feeding rate of slurry (part/min.) | Total esterification time (min.) | Temperature (°C) | Time (min.) | Intrinsic viscosity [η] | Melting point (°C) | *DEG (mol%) | Color tone L | a | b |
| 4 | 1.30 | 10 | " | 0.643 | 225 | " | 190 | " | 259.0 | 2.25 | 71.9 | −2.4 | 4.5 |
| 5 | 1.40 | 6 | " | 0.548 | 270 | " | 210 | " | 255.0 | 3.18 | 67.2 | −3.5 | 6.8 |

*DEG represents diethylene glycol. Hereinafter this abbreviation is used.

As seen from Table 1, when the molar ratio of EG/TPA exceeds 1.30, the feeding rate of slurry is decreased, the esterification time prolongs and the productivity is lowered considerably. Moreover, in the resulting polyester, the DEG content is increased and the color tone is deteriorated.

EXAMPLE 2

Esterification reactions and polycondensation reactions were effected in the exactly same manner as described in Experiment No. 2 of Example 1, except that the esterification temperature was varied, to obtain a result as shown in the following Table 2.

Table 2

| Experiment No. | Properties of TPA | | | | Esterification | | | | |
|---|---|---|---|---|---|---|---|---|---|
| | Slurry forming ability | Slurry stability (%) | 4-CBA (ppm) | b | EG/TPA (molar ratio) | Viscosity of slurry (poise) | Temperature (°C) | Feeding rate of slurry (part/min.) | Total esterification time (min.) |
| 6 | 0.40 | 72 | 360 | 1.1 | 1.15 | 18 | 250 | 0.798 | 170 |
| 7 | " | " | " | " | " | " | 240 | 0.650 | 210 |
| 8 | " | " | " | " | " | " | 230 | 0.305 | 435 |

| Experiment No. | Polycondensation | | Properties of polyester | | | | |
|---|---|---|---|---|---|---|---|
| | Temperature (°C) | Time (min.) | Intrinsic viscosity [η] | Melting point (°C) | DEG (mol%) | Color tone L | a | b |
| 6 | 280 | 165 | 0.65 | 263.5 | 1.40 | 76.8 | −1.5 | 3.4 |
| 7 | " | 165 | " | 262.5 | 1.45 | 76.8 | −1.5 | 3.0 |
| 8 | " | 190 | " | 252.5 | 3.45 | 69.5 | −2.4 | 8.9 |

As seen from Table 2, when the esterification temperature is lower than 240° C, feeding rate of slurry cannot be increased due to low esterification reaction rate. Consequently, the esterification prolongs and the productivity is lowered considerably. Moreover, in the resulting polyester, the DEG content is increased and the color tone is deteriorated.

EXAMPLE 3

Esterification reactions and polycondensation reactions were effected in the same manner as described in Experiment No. 2 of Example 1 under the conditions as shown in the following Table 3 by using the polyester oligomer obtained in Example 1 and TPA/EG slurries containing various TPAs. The obtained result is shown in Table 3.

Table 3

| Experiment No. | Properties of TPA | | | | Esterification | | | | |
|---|---|---|---|---|---|---|---|---|---|
| | Slurry forming ability | Slurry stability (%) | 4-CBA (ppm) | b | EG/TPA (molar ratio) | Viscosity of slurry (poise) | Temperature (°C) | Feeding rate of slurry (part/min.) | Total esterification time (min.) |
| 9 | 0.40 | 72 | 360 | 1.1 | 1.15 | 18 | 250 | 0.798 | 170 |
| 10 | 0.43 | 70 | 400 | 1.5 | " | 30 | " | 0.798 | 175 |
| 11 | 0.45 | 75 | 350 | 1.1 | " | 41 | " | 0.708 | 195 |
| 12 | 0.48 | 78 | 380 | 1.3 | " | 57 | " | 0.575 | 235 |
| 13 | 0.53 | 75 | 340 | 1.0 | " | — | — | — | — |

| Experiment No. | Polycondensation | | Properties of polyester | | | | |
|---|---|---|---|---|---|---|---|
| | Temperature (°C) | Time (min.) | Intrinsic viscosity [η] | Melting point (°C) | DEG (mol%) | Color tone L | a | b |
| 9 | 280 | 165 | 0.65 | 263.5 | 1.40 | 76.8 | −1.5 | 3.4 |
| 10 | " | 165 | " | 263.5 | 1.43 | 76.5 | −1.8 | 3.5 |
| 11 | " | 170 | " | 262.0 | 1.68 | 75.3 | −2.0 | 3.8 |
| 12 | " | 180 | " | 258.5 | 2.20 | 72.4 | −2.3 | 4.6 |
| 13 | — | — | — | — | — | — | — | — |

In Experiment No. 13, a homogeneous slurry was not formed, and it was impossible to feed continuously this slurry. When the slurry forming ability of TPA is too poor, the TPA cannot be formed into a homogeneous slurry together with EG, and accordingly continuous addition of such slurry is impossible.

Moreover, as the slurry forming ability of TPA decreases, the DEG content is more increased and the color tone is more deteriorated in the resulting polyester.

EXAMPLE 4

Esterification reactions and polycondensation reactions were effected in the same manner as described in Experiment No. 2 of Example 1 under the conditions as shown in the following Table 4 by using the polyester oligomer obtained in Example 1 and TPA/EG slurries containing various TPAs to obtain various polyesters. The obtained result is shown in Table 4.

Table 4

| Experiment No. | Properties of TPA | | | | Esterification | | | | |
|---|---|---|---|---|---|---|---|---|---|
| | Slurry forming ability | Slurry stability (%) | 4-CBA (ppm) | b | EG/TPA (molar ratio) | Viscosity of slurry (poise) | Temperature (°C) | Feeding rate of slurry (part/min) | Total esterification time (min.) |
| 14 | 0.43 | 65 | 500 | 1.7 | 1.15 | 30 | 250 | 0.825 | 165 |
| 15 | 0.44 | 41 | 25 | 0.5 | ″ | 34 | ″ | 0.650 | **250 |
| 16 | 0.74 | 63 | 10 | 0.4 | *″ (2.0) | *∞ (30) | ″ | 0.628 | 270 |

| Experiment No. | Polycondensation | | Properties of polyester | | | | | |
|---|---|---|---|---|---|---|---|---|
| | Temperature (°C) | Time (min.) | Intrinsic viscosity [η] | Melting point (°C) | DEG (mol%) | Color tone L | a | b |
| 14 | 280 | 165 | 0.65 | 262.0 | 1.52 | 75.5 | −1.6 | 3.8 |
| 15 | ″ | 165 | ″ | 257.0 | 2.58 | 73.7 | −1.2 | 6.9 |
| 16 | ″ | 180 | ″ | 253.5 | 3.64 | 74.2 | −2.8 | 6.5 |

*Since slurry was not formed in a molar ratio of EG/TPA of 1015, EG was further added to the mixture to increase the molar ratio of 2.0, and the resulting slurry was used in the esterification reaction.
**Slurry clogged inside the feeding pipe, and this esterification time includes time required for cleaning the apparatus.

As seen from Table 4, in Experiment No. 15, the TPA had a poor slurry stability and the slurry clogged very often inside the feeding pipe of the esterification apparatus. Consequently, it is impossible to feed continuously the slurry into the apparatus, resulting in a low productivity. Moreover, in the resulting polyester, the DEG content is high and the color tone is deteriorated. The total esterification time includes time required for cleaning the apparatus. While, in Experiment No. 16, the TPA had a poor slurry forming ability, and a slurry was not formed in a molar ratio of EG/TPA of 1.15. Accordingly, a slurry was prepared by increasing the molar ratio to 2.0, and the resulting slurry was used in the esterification and polycondensation reaction to produce a polyester. In the resulting polyester, the DEG content is high and the polyester is poor in the quality.

EXAMPLE 5

Esterification reactions and polycondensation reaction were effected in the same manner as described in Experiment No. 1 of Example 1 under the conditions as shown in the following Table 5 by using the polyester oligomer obtained in Example 1 and TPA/EG slurries containing various TPAs having different 4-CBA contents to obtain various polyesters. The obtained result is shown in Table 5.

Table 5

| Experiment No. | Properties of TPA | | | | Esterification | | | | |
|---|---|---|---|---|---|---|---|---|---|
| | Slurry forming ability | Slurry stability (%) | 4-CBA (ppm) | b | EG/TPA (molar ratio) | Viscosity of slurry (poise) | Temperature (°C) | Feeding rate of slurry (part/min) | Total esterification time (min.) |
| 17 | 0.41 | 70 | 250 | 1.8 | 1.10 | 30 | 250 | 0.812 | 165 |
| 18 | 0.40 | 70 | 580 | 1.3 | ″ | 27 | ″ | 0.812 | ″ |
| 19 | 0.41 | 74 | 750 | 1.7 | ″ | 30 | ″ | 0.812 | ″ |

| Experiment No. | Polycondensation | | Properties of polyester | | | | | |
|---|---|---|---|---|---|---|---|---|
| | Temperature (°C) | Time (min) | Intrinsic viscosity [η] | Melting point (°C) | DEG (mol%) | Color tone L | a | b |
| 17 | 280 | 160 | 0.65 | 264.0 | 1.33 | 77.2 | −1.1 | 2.7 |
| 18 | ″ | ″ | ″ | 263.0 | 1.40 | 75.3 | −2.1 | 3.5 |
| 19 | ″ | ″ | ″ | 263.5 | 1.35 | 75.2 | −2.2 | 5.9 |

As seen from Table 5, as the 4-CBA content in TPA increases, the color tone of the resulting polyester is more deteriorated, and when the 4-CBA content exceeds 600 ppm, polyesters having a satisfactorily high quality to be used for textile filaments cannot be obtained.

EXAMPLE 6

In the first stage reaction vessel of a continuous type esterification apparatus composed of three stages of reaction vessel equipped with a fractionating column and a stirrer, 200 parts of a polyester oligomer was prepared in the same manner as described in Example 1. Then, a slurry having a molar ratio of EG/TPA of 1.10, which was prepared by kneading 166.0 parts of TPA, 68.2 parts of EG and 0.06 part of antimony trioxide, was fed to the above obtained polyester oligomer in the first stage reaction vessel of the esterification apparatus at a rate of 133.8 parts/hr., and an esterification reaction was effected continuously in the esterification apparatus under such a condition that the esterification temperature and the residence time in each reaction vessel were 250° C and 1.75 hours, respectively. Then, the resulting esterification product flowed out continuously from the esterification apparatus was polycondensed continuously by means of a continuous type polycondensation apparatus composed of two stages of reaction vessels equipped with a vacuum means and a stirrer and one stage of horizontal type reaction vessel under such a condition that the residence time, the reaction temperature and the degree of vacuum in the first stage reaction vessel were 1.5 hours, 270° C and 50 mmHg, those in the second stage reaction vessel were 1.5 hours, 275° C and 5 mmHg, and those in the horizontal type reaction vessel were 1.25 hours, 275° C and 1 mmHg.

Properties of the TPA used, ester conversion ratio of the esterification product flowed out from the third esterification vessel after 24 hours from the beginning of the operation of the esterification apparatus, and properties of the resulting polyester after 24 hours from the beginning of the operation of the polycondensation apparatus are shown in the following Table 6.

Into a reaction vessel equipped with a fractionating column and a stirrer was charged 100 parts of the above obtained polyester oligomer and melted. Then, slurries composed of the above described TPA and EG in various molar ratios as shown in the following Table 7 were fed to the above melted polyester oligomer in an amount of 86.5 parts calculated as TPA, and esterification reactions were effected under the conditions as shown in Table 7 to obtain esterification products. 100 parts of the resulting esterification product was left in the reaction vessel. The remainder of the esterification product was taken out from the vessel and polycondensed in the presence of 0.03 part of antimony trioxide and 0.02 part of cobalt acetate (cobalt atomic equivalent based on 1 mole of 4-CBA is 0.39, which is shown by the term "Co/4-CBA" hereinafter). The esterification reaction and polycondensation reaction were repeated 5 times. Properties of the resulting polyester obtained in the fifth time of the procedure are shown in Table 7.

Table 7

| | Properties of TPA | | | | Esterification | | | | |
|---|---|---|---|---|---|---|---|---|---|
| Experiment No. | Slurry forming ability | Slurry stability (%) | 4-CBA (ppm) | b | EG/TPA (molar ratio) | Viscosity of slurry (poise) | Temperature (° C) | Feeding rate o slurry (part/min.) | Total esterification time (min.) |
| 24 | 0.40 | 72 | 360 | 1.1 | 1.10 | 25 | 250 | 0.812 | 165 |
| 25 | " | " | ". | " | 1.15 | 18 | " | 0.798 | 170 |
| 26 | " | " | " | " | 1.20 | 13 | " | 0.740 | 195 |
| 27 | " | " | " | " | 1.30 | 10 | " | 0.643 | 225 |
| 28 | " | " | " | " | 1.40 | 6 | " | 0.548 | 270 |

| | Polycondensation | | | Properties of polyester | | | | |
|---|---|---|---|---|---|---|---|---|
| Experiment No. | Temperature (° C) | Time (min.) | Intrinsic viscosity [η] | Melting point (° C) | DEG (mol%) | Color tone L | a | b |
| 24 | 280 | 155 | 0.65 | 264.0 | 1.38 | 75.1 | −1.0 | −0.2 |
| 25 | " | 160 | " | 263.0 | 1.45 | 74.5 | −1.1 | 0.6 |
| 26 | " | 160 " | 261.5 | 1.70 | 72.9 | −1.4 | 1.4 | |
| 27 | " | 180 | " | 258.5 | 2.38 | 68.8 | −1.9 | 3.3 |
| 28 | " | 195 | " | 254.0 | 3.41 | 64.6 | −2.8 | 4.5 |

As seen from Table 7, when the molar ratio of EG/TPA exceeds 1.30, the feeding rate of slurry is decreased, the esterification time prolongs, and the productivity is considerably lowered. Moreover, in the Table 6

| | Properties of TPA | | | | Esterification | | Properties of polyester | | | | |
|---|---|---|---|---|---|---|---|---|---|---|---|
| Experiment No. | Slurry forming ability | Slurry stability (%) | 4-CBA (ppm) | b | Viscosity of slurry (poise) | Ester conversion ratio (%) | Intrinsic viscosity [η] | Melting point (° C) | DEG (mol%) | Color tone L | a | b |
| 20 | 0.40 | 72 | 360 | 1.1 | 25 | 95.8 | 0.65 | 264.0 | 1.09 | 77.0 | −1.2 | 3.0 |
| 21 | 0.40 | 70 | 580 | 1.8 | 27 | 95.6 | 0.65 | 263.0 | 1.19 | 75.3 | −2.1 | 3.5 |
| 22 | 0.41 | 76 | 540 | 2.3 | 30 | 95.6 | 0.65 | 264.3 | 1.14 | 75.0 | −2.4 | 5.6 |
| 23 | 0.41 | 76 | 840 | 2.3 | 30 | 95.6 | 0.65 | 263.5 | 1.12 | 74.8 | −3.4 | 6.5 |

EXAMPLE 7

A slurry was prepared by kneading 166.0 parts of TPA having a slurry forming ability of 0.40, a slurry stability of 72%, a 4-CBA content of 360 ppm and b value of 1.1 and 68.2 parts of EG, and the resulting slurry was reacted at a temperature of 240° to 250° C and under a pressure of 2.5 Kg/cm for 2.5 hours in a reaction vessel equipped with a fractionating column and a stirrer to obtain 34.2 parts of water and 200 parts of a polyester oligomer (ester conversion ratio:95%).

resulting polyester, the DEG content is increased and the color tone is decreased.

EXAMPLE 8

Esterification reactions and polycondensation reactions were repeated in the exactly same manner as described in Experiment No. 25 of Example 7, except that the esterification temperature was varied as shown in the following Table 8 and the addition amount of cobalt acetate was varied to Co/4-CBA=0.42. The obtained result is shown in Table 8.

Table 8

| Properties of TPA | Esterification |
|---|---|

Table 8-continued

| Experiment No. | Slurry forming ability | Slurry stability (%) | 4-CBA (ppm) | b | EG/TPA (molar ratio) | Viscosity of slurry (poise) | Temperature (°C) | Feeding rate of slurry (part/min.) | Total esterification time (min.) |
|---|---|---|---|---|---|---|---|---|---|
| 29 | 0.40 | 72 | 360 | 1.1 | 1.15 | 18 | 250 | 0.798 | 170 |
| 30 | " | " | " | " | " | " | 240 | 0.650 | 210 |
| 31 | " | " | " | " | " | " | 230 | 0.305 | 435 |

| | Polycondensation | | Properties of polyester | | | | | |
|---|---|---|---|---|---|---|---|---|
| Experiment No. | Temperature (°C) | Time (min.) | Intrinsic viscosity [η] | Melting point (°C) | DEG (mol%) | L | Color tone a | b |
| 29 | 280 | 160 | 0.65 | 263.5 | 1.48 | 74.0 | −1.2 | 0.2 |
| 30 | " | 160 | " | 262.0 | 1.52 | 74.8 | −1.3 | 0.2 |
| 31 | " | 185 | " | 252.0 | 3.60 | 68.0 | −2.2 | 6.6 |

As seen from Table 8, when the esterification temperature is lower than 240° C, the esterification reaction rate is low, and it is impossible to increase the feeding rate of slurry in order to maintain the given esterification condition. Accordingly, the esterification time prolongs, and the productivity is considerably lowered. Moreover, the resulting polyester always has a high DEG content and a deteriorated color tone.

EXAMPLE 9

Esterification reactions and polycondensation reactions were repeated in the same manner as described in Experiment No. 25 of Example 7 under the conditions as described in the following Table 9 by using the polyester oligomer obtained in Example 7 and TPA/EG slurries containing various TPAs and adding cobalt acetate in an amount of Co/4-CBA of 0.33. The obtained result is shown in Table 9.

In Experiment No. 36, a homogeneous slurry was not obtained, and continuous feeding of this slurry was impossible. When the slurry forming ability of TPA is too poor, the TPA cannot be formed into a homogeneous slurry together with EG, and accordingly continuous feeding of such slurry is impossible. Moreover as the slurry forming ability of TPA decreases, the DEG content is more increased and the color tone is more deteriorated in the resulting polyester.

EXAMPLE 10

Esterification reactions and polycondensation reactions were repeated in the same manner as described in Experiment No. 25 of Example 7 under the conditions as shown in the following Table 10 by using the polyester oligomer obtained in Example 7 and TPA/EG slurries containing various TPAs and adding cobalt acetate in an amount of Co/4-CBA of 0.30. The obtained result is shown in Table 10.

Table 9

| | Properties of TPA | | | | | Esterification | | | |
|---|---|---|---|---|---|---|---|---|---|
| Experiment No. | Slurry forming ability | Slurry stability (%) | 4-CBA (ppm) | b | EG/TPA (molar ratio) | Viscosity of slurry (poise) | Temperature (°C) | Feeding rate of slurry (part/min.) | Total esterification time (min.) |
| 32 | 0.40 | 72 | 360 | 1.1 | 1.15 | 18 | 250 | 0.798 | 170 |
| 33 | 0.43 | 70 | 400 | 1.5 | " | 30 | " | 0.798 | 175 |
| 34 | 0.45 | 75 | 350 | 1.1 | " | 41 | " | 0.708 | 195 |
| 35 | 0.48 | 78 | 380 | 1.3 | " | 57 | " | 0.575 | 235 |
| 36 | 0.53 | 75 | 340 | 1.0 | " | — | — | — | — |

| | Polycondensation | | Properties of polyester | | | | | |
|---|---|---|---|---|---|---|---|---|
| Experiment No. | Temperature (°C) | Time (min.) | Intrinsic viscosity [η] | Melting point (°C) | DEG (mol%) | L | Color tone a | b |
| 32 | 280 | 160 | 0.65 | 263.0 | 1.45 | 74.5 | −1.1 | 0.6 |
| 33 | " | 160 | " | 263.5 | 1.49 | 73.8 | −1.2 | 1.2 |
| 34 | " | 165 | " | 261.5 | 1.73 | 73.2 | −1.8 | 2.0 |
| 35 | " | 170 | " | 259.0 | 2.28 | 70.6 | −2.4 | 3.5 |
| 36 | — | — | — | — | — | — | — | — |

Table 10

| | Properties of TPA | | | | | Esterification | | | |
|---|---|---|---|---|---|---|---|---|---|
| Experiment No. | Slurry forming ability | Slurry stability (%) | 4-CBA (ppm) | b | EG/TPA (molar ratio) | Viscosity of slurry (poise) | Temperature (°C) | Feeding rate of slurry (part/min.) | Total esterification time (min.) |
| 37 | 0.43 | 65 | 500 | 1.7 | 1.15 | 30 | 250 | 0.825 | 165 |
| 38 | 0.44 | 41 | 25 | 0.5 | " | 34 | " | 0.650 | 250 |
| 39 | 0.74 | 63 | 10 | 0.4 | " (2.0) | ∞ (30) | " | 0.628 | 270 |

Table 10-continued

| | Polycondensation | | | Properties of Polyester | | | | |
|---|---|---|---|---|---|---|---|---|
| Experiment No. | Temperature (°C) | Time (min.) | Intrinsic viscosity [η] | Melting point (°C) | DEG (mol%) | Color tone L | a | b |
| 37 | 280 | 150 | 0.65 | 262.0 | 1.58 | 74.0 | −1.3 | 0.8 |
| 38 | " | 155 | " | 256.5 | 2.72 | 69.4 | −2.7 | 4.8 |
| 39 | " | 170 | " | 252.0 | 3.81 | 71.2 | −2.0 | 3.5 |

In Experiment No. 38, the TPA had a poor slurry stability and the slurry clogged very often inside of the feeding pipe of the esterification apparatus. Consequently, it is impossible to feed continuously the slurry into the apparatus, and the productivity is considerably low. Moreover, in the resulting polyester, the DEG content is high and the color tone is deteriorated. The total esterification time includes time required for cleaning the apparatus. While, in Experiment No. 39, a slurry was not formed in a molar ratio of EG/TPA of 1.15. Accordingly, a slurry was prepared by increasing the molar ratio to 2.0, and an esterification reaction and a polycondensation reaction were effected by using the slurry to produce a polyester. In the resulting polyester, the DEG content is high and the polyester is poor in the quality.

EXAMPLE 11

Esterification reactions and polycondensation reactions were repeated in the same manner as described in Experiment No. 25 of Example 7 under the conditions as described in the following Table 11 by using the polyester oligomer obtained in Example 7 and TPA/EG slurries containing various TPAs having different 4-CBA contents. The obtained result is shown in Table 11.

reaction vessels equipped with a fractionating column and a stirrer, 200 parts of a polyester oligomer was prepared in the same manner as described in Example 1. Then, a slurry having a molar ratio of EG/TPA of 1.10, which was prepared by kneading 166.0 parts of TPA, 68.2 parts of EG, 0.04 part of cobalt chloride and 0.06 part of antimony trioxide, was fed to the above obtained polyester oligomer in the first stage reaction vessel of the esterification apparatus at a rate of 133.8 parts/hr., and an esterification reaction was effected continuously in the esterification apparatus under such a condition that the esterification temperature and the residence time in each reaction vessel were 250° C and 1.75 hours, respectively. Then, the resulting esterification product flowed out continuously from the esterification apparatus was polycondensed continuously by means of a continuous type polycondensation apparatus composed of two stages of reaction vessels equipped with a vacuum means and a stirrer and one stage of a horizontal type reaction vessel under such a condition that the residence time, the reaction temperature and the degree of vacuum in the first stage reaction vessel were 1.5 hours, 270° C and 50 mmHg, those in the second stage reaction vessel were 1.5 hours, 275° C and 5 mmHg, and those of the horizontal type reaction vessel were 1.25 hours, 275° C and 1 mmHg.

Table 11

| | Properties of TPA | | | | Esterification | | | |
|---|---|---|---|---|---|---|---|---|
| Experiment No. | Slurry forming ability | Slurry stability (%) | 4-CBA (ppm) | b | Viscosity of slurry (poise) | Temperature (°C) | Feeding rate of slurry (part/min.) | Total esterification time (min.) |
| 40 | 0.41 | 70 | 250 | 1.8 | 25 | 250 | 0.798 | 172 |
| 41 | 0.40 | 70 | 580 | 1.3 | 16 | " | " | " |
| 42 | 0.41 | 76 | 840 | 2.0 | 23 | " | " | " |
| 43 | 0.40 | 70 | 1,400 | 2.4 | 16 | " | " | " |

| | Polycondensation | | | | Properties of polyester | | | | |
|---|---|---|---|---|---|---|---|---|---|
| Experiment No. | *Co/4-CBA | Temperature (°C) | Time (min.) | Intrinsic viscosity [η] | Melting point (°C) | DEG (mol%) | Color tone L | a | b |
| 40 | 0.56 | 280 | 160 | 0.65 | 262.5 | 1.58 | 75.0 | −1.0 | −0.4 |
| 41 | 0.24 | " | " | " | 262.8 | 1.53 | 74.1 | −1.4 | 2.8 |
| 42 | 0.20 | " | " | " | 262.3 | 1.63 | 69.0 | −2.1 | 3.7 |
| 43 | 0.20 | " | " | " | 261.5 | 1.72 | 62.3 | −4.4 | 3.1 |

*The term "Co/4-CBA" represents the amount of Co atomic equivalent based on 1 mole of 4-CBA.

As seen from Table 11, as the 4-CBA content in TPA increases, the color tone of the resulting polyester is more deteriorated, and when the 4-CBA content exceeds 1,000 ppm, polyesters having a satisfactorily high quality to be used for textile filaments cannot be obtained.

EXAMPLE 12

In the first stage reaction vessel of a continuous type esterification apparatus composed of three stages of Properties of the TPA used, ester conversion ratio of the esterification product flowed out from the third esterification vessel after 24 hours from the beginning of the operation of the esterification apparatus, and properties of the resulting polyester after 24 hours from the beginning of the operation of the polycondensation apparatus are shown in the following Table 12.

Table 12

| Experiment No. | Properties of TPA | | | | Esterification | | Polycondensation | | | Properties of polyester | | | | | |
|---|---|---|---|---|---|---|---|---|---|---|---|---|---|---|---|
| | Slurry forming ability | Slurry stability (%) | 4-CBA (ppm) | b | Viscosity of slurry (poise) | Ester conversion ratio (%) | Co/4-CBA | Temperature (°C) | Time (min.) | Intrinsic viscosity [η] | Melting point (°C) | DEG (mol%) | Color tone L | a | b |
| 44 | 0.40 | 72 | 360 | 1.1 | 18 | 95.6 | 0.42 | 280 | 160 | 0.65 | 263.4 | 1.22 | 74.8 | −1.3 | 0.2 |
| 45 | 0.41 | 76 | 840 | 2.0 | 23 | 95.8 | 0.18 | " | " | " | 263.2 | 1.30 | 73.5 | −1.8 | 3.7 |
| 46 | 0.42 | 74 | 1,220 | 2.7 | 27 | 95.3 | 0.12 | " | " | " | 262.7 | 1.34 | 71.3 | −2.8 | 6.3 |
| 47 | 0.42 | 75 | 850 | 2.8 | 27 | 95.5 | 0.18 | " | " | " | 262.5 | 1.32 | 72.5 | −2.5 | 6.2 |

As seen from Table 12, as the b value of TPA is higher, the color tone of the resulting polyester is more deteriorated. Particularly, when the b value of TPA exceeds 2.5, polyesters having an excellent color tone cannot be obtained.

EXAMPLE 13

Reactions were repeated under the same condition as described in Experiment No. 29 of Example 8, except that TPA having a slurry forming ability of 0.43, a slurry stability of 71%, a 4-CBA content of 800 ppm and b value of 2.4 was used and cobalt acetate and trimethyl phosphate were added to the polycondensation reaction system, to obtain polyesters as shown in the following Table 13.

Table 13

| Experiment No. | Additive | | Polycondensation | | Properties of polyester | | | | | |
|---|---|---|---|---|---|---|---|---|---|---|
| | Cobalt acetate (Co/4-CBA) | *Trimethyl phosphate (ppm) | Temperature (°C) | Time (min.) | Intrinsic viscosity [η] | Melting point (°C) | DEG (mol%) | Color tone L | a | b |
| 48 | — | — | 280 | 165 | 0.65 | 263.5 | 1.40 | 75.3 | −3.0 | 7.2 |
| 49 | 0.03 | 50 | " | " | " | 263.5 | 1.48 | 75.0 | −2.8 | 6.6 |
| 50 | 0.06 | 50 | " | " | " | 263.0 | 1.53 | 75.1 | −1.9 | 4.5 |
| 51 | 0.12 | 100 | " | " | " | 261.5 | 1.72 | 74.2 | −1.5 | 2.1 |
| 52 | 0.30 | 250 | " | " | " | 261.0 | 1.84 | 71.6 | −2.0 | −1.0 |
| 53 | 0.60 | 500 | " | " | " | 259.5 | 2.11 | 68.6 | −2.4 | −2.8 |

*The addition amount of trimethyl phosphate (phosphorus compound) is based on the weight of terephthalic acid.

As seen from Table 13, when Co/4-CBA is less than 0.05, the resulting polyester has a high b value, and polyesters having a high quality cannot be obtained.

EXAMPLE 14

Reactions were repeated under the exactly same condition as described in Example 13, except that TPA having a slurry forming ability of 0.40, a slurry stability of 75%, a 4-CBA content of 180 ppm and b value of 1.4 was used and various amounts of cobalt acetate and triphenyl phosphate were used, to obtain a result as shown in the following Table 14.

Table 14

| Experiment No. | Additive | | Polycondensation | | Properties of polyester | | | | | |
|---|---|---|---|---|---|---|---|---|---|---|
| | Cobalt acetate (Co/4-CBA) | Triphenyl phosphate (ppm) | Temperature (°C) | Time (min.) | Intrinsic viscosity [η] | Melting point (°C) | DEG (mol%) | Color tone L | a | b |
| 54 | — | — | 280 | 165 | 0.65 | 263.0 | 1.50 | 78.8 | −1.5 | 2.3 |
| 55 | 0.13 | 115 | " | 165 | " | 263.0 | 1.58 | 78.4 | −1.8 | 1.5 |
| 56 | 0.27 | 115 | " | 165 | " | 262.5 | 1.53 | 78.2 | −1.3 | 0.4 |
| 57 | 0.54 | 230 | " | 160 | " | 262.5 | 1.64 | 77.6 | −2.3 | −0.3 |
| 58 | 1.21 | 580 | " | 165 | " | 260.0 | 1.93 | 73.5 | −2.0 | −2.2 |
| 59 | 2.25 | 1,050 | " | 165 | " | 258.5 | 2.05 | 66.5 | −2.4 | −4.6 |
| 60 | 3.34 | 1,400 | " | 175 | " | 256.0 | 2.93 | 62.2 | −2.8 | −6.8 |

When the addition amount of a cobalt compound is more than a necessary amount as in the case of Experiment No. 60, the DEG content in the resulting polyester is increased, and at the same time the color tone of the polyester is considerably decreased.

EXAMPLE 15

Reactions were repeated under the same condition as described in Experiment No. 29 of Example 8, except that different kinds of cobalt compounds are used, to obtain a result as shown in the following Table 15. In the above reactions, the addition amount of any of cobalt chloride, cobalt benzoate, cobalt oxalate and cobalt borate is 0.42 calculated as Co/4-CBA.

Table 15

| Experiment No. | Additive | | Polycondensation | | Properties of polyester | | | | | |
|---|---|---|---|---|---|---|---|---|---|---|
| | Cobalt compound | Trimethyl phosphate (ppm) | Temperature (°C) | Time (min.) | Intrinsic viscosity [η] | Melting point (°C) | DEG (mol%) | Color tone L | a | b |
| 61 | Cobalt chloride | 200 | 280 | 160 | 0.65 | 263.0 | 1.52 | 73.5 | −1.2 | 0.1 |
| 62 | Cobalt benzoate | " | " | " | " | 262.4 | 1.45 | 74.0 | −1.5 | 0.3 |
| 63 | Cobalt oxalate | " | " | " | " | 262.9 | 1.54 | 75.4 | −1.4 | −0.3 |

Table 15-continued

| Experiment No. | Additive Cobalt compound | Trimethyl phosphate (ppm) | Polycondensation Temperature (°C) | Time (min.) | Intrinsic viscosity [η] | Properties of polyester Melting point (°C) | DEG (mol %) | Color tone L | a | b |
|---|---|---|---|---|---|---|---|---|---|---|
| 64 | Cobalt borate | " | " | " | " | 262.3 | 1.48 | 74.5 | −1.6 | 0.2 |

What is claimed is:

1. A method of producing polyethylene terephthalate from terephthalic acid and ethylene glycol, which comprises continuously feeding a slurry of terephthalic acid in ethylene glycol having a molar ratio of ethylene glycol to terephthalic acid of not more than 1.3, into a reaction system containing at least one of bis-(β-hydroxyethyl) terephthalate and oligomers thereof, said terephthalic acid having a slurry forming ability of not more than 0.48, a slurry stability of not less than 60%, 4-carboxybenzaldehyde content of not more than 600 ppm and a b value of not more than 2.0, wherein slurry forming ability is defined as the weight ratio of ethylene glycol to terephthalic acid in a slurry having a viscosity of 30 poises and slurry stability is determined by the equation $$\text{slurry stability} = \eta/30 \times 100$$

wherein η is the slurry viscosity measured 5 minutes after a slurry having an initial viscosity of 30 poises is placed in a vessel having a diameter of 75 mm to a depth of 10 cm; effecting the esterification reaction at a temperature of not lower than 240° C while removing the formed water out of the reaction system and then effecting the polycondensation.

2. A method of producing polyethylene terephthalate from terephthalic acid and ethylene glycol, which comprises continuously feeding a slurry of terephthalic acid in ethylene glycol having a molar ratio of ethylene glycol to terephthalic acid of not more than 1.3, into a reaction system containing at least one of bis-(β-hydroxyethyl) terephthalate and oligomers thereof, said terephthalic acid having a slurry forming ability of not more than 0.48, a slurry stability of not less than 60%, 4-carboxybenzaldehyde content of not more than 1,000 ppm and a b value of not more than 2.5, wherein slurry forming ability is defined as the weight ratio of ethylene glycol to terephthalic acid in a slurry having a viscosity of 30 poises and slurry stability is determined by the equation $$\text{slurry stability} = \eta/30 \times 100$$

wherein η is the slurry viscosity measured 5 minutes after a slurry having an initial viscosity of 30 poises is placed in a vessel having a diameter of 75 mm to a depth of 10 cm; effecting the esterification reaction at a temperature of not lower than 240° C while removing the formed water out of the reaction system and then effecting the polycondensation in the presence of a cobalt salt of 0.05 to 3.0 calculated as cobalt atomic equivalent per one mole of 4-carboxybenzaldehyde in said terephthalic acid.

3. A method as claimed in claim 1, wherein said terephthalic acid has a slurry forming ability of not more than 0.45.

4. A method as claimed in claim 1, wherein said terephthalic acid has a slurry forming ability of not more than 0.43.

5. A method as claimed in claim 1, wherein said terephthalic acid has a slurry stability of not less than 65%.

6. A method as claimed in claim 1, wherein said terephthalic acid has a slurry stability of not less than 70%.

7. A method as claimed in claim 1, wherein said molar ratio is not more than 1.2.

8. A method as claimed in claim 1, wherein said molar ratio is not more than 1.15.

9. A method as claimed in claim 1, wherein said esterification temperature is 245°–260° C.

10. A method as claimed in claim 1, wherein said content of 4-carboxybenzaldehyde is not more than 400 ppm.

11. A method as claimed in claim 1, wherein said content of 4-carboxybenzaldehyde is not more than 300 ppm.

12. A method as claimed in claim 1, wherein said b value is not more than 1.5.

13. A method as claimed in claim 1, wherein said b value is not more than 1.0.

14. A method as claimed in claim 2, wherein said terephthalic acid has a slurry forming ability of not more than 0.45.

15. A method as claimed in claim 2, wherein said terephthalic acid has a slurry forming ability of not more than 0.43.

16. A method as claimed in claim 2, wherein said terephthalic acid has a slurry stability of not less than 65%.

17. A method as claimed in claim 2, wherein said terephthalic acid has a slurry stability of not less than 70%.

18. A method as claimed in claim 2, wherein said molar ratio is not more than 1.2.

19. A method as claimed in claim 2, wherein said molar ratio is not more than 1.15.

20. A method as claimed in claim 2, wherein said esterification temperature is 245°–260° C.

21. A method as claimed in claim 2, wherein said content of 4-carboxybenzaldehyde is not more than 600 ppm.

22. A method as claimed in claim 2, wherein said content of 4-carboxybenzaldehyde is not more than 400 ppm.

23. A method as claimed in claim 2, wherein said b value is not more than 2.0.

24. A method as claimed in claim 2, wherein said b value is not more than 1.5.

25. A method as claimed in claim 2, wherein said polycondensation is effected in the presence of a cobalt salt in an amount of 0.1 to 2.0 calculated as cobalt atomic equivalent per one mole of 4-carboxybenzaldehyde.

26. A method as claimed in claim 2, wherein said polycondensation is effected in the presence of a cobalt salt in an amount of 0.2 to 1.0 calculated as cobalt atomic equivalent per one mole of 4-carboxybenzaldehyde.

27. A method as claimed in claim 2, wherein said cobalt salt is selected from the group consisting of cobalt acetate, cobalt chloride, cobalt nitrate, cobalt carbonate, cobalt borate, cobalt benzoate and cobalt oxalate.

28. A method as claimed in claim 2, wherein said cobalt salt is cobalt acetate.

* * * * *